US011327257B1

(12) United States Patent
Margolin et al.

(10) Patent No.: US 11,327,257 B1
(45) Date of Patent: May 10, 2022

(54) NETWORKING COMMUNICATION ADAPTER

(71) Applicant: Mellanox Technologies, Ltd., Yokneam (IL)

(72) Inventors: Ilya Margolin, Nesher (IL); Rony Setter, Kfar Glikson (IL); Andrey Ger, Shlomi (IL); Yaniv Kazav, Hedera (IL); Tarek Hathoot, Ako (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 17/077,089

(22) Filed: Oct. 22, 2020

(51) Int. Cl.
*H04B 10/00* (2013.01)
*G02B 6/42* (2006.01)
*H04B 10/40* (2013.01)

(52) U.S. Cl.
CPC ......... *G02B 6/4261* (2013.01); *G02B 6/4284* (2013.01); *H04B 10/40* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,128,627 | B1* | 11/2018 | Kazav | G02B 6/4269 |
| 10,151,888 | B2* | 12/2018 | Badehi | G02B 6/3861 |
| 10,411,423 | B1 | 9/2019 | Park et al. | |
| 2009/0251867 | A1* | 10/2009 | Sharma | H05K 1/14 |
| | | | | 361/737 |
| 2018/0191115 | A1* | 7/2018 | Khazen | G02B 6/4261 |
| 2018/0299624 | A1 | 10/2018 | Leigh et al. | |
| 2019/0044299 | A1* | 2/2019 | Kazav | H01R 13/518 |
| 2020/0220289 | A1* | 7/2020 | Scholeno | H05K 7/20145 |
| 2020/0280329 | A1* | 9/2020 | Lam | H04L 7/0016 |
| 2020/0280428 | A1* | 9/2020 | Kovacs | H04L 1/004 |
| 2020/0358228 | A1* | 11/2020 | Henry | H01R 13/633 |
| 2021/0011224 | A1* | 1/2021 | Chen | H04L 12/40013 |
| 2021/0051099 | A1* | 2/2021 | Iwasaki | H04L 49/30 |
| 2021/0098927 | A1* | 4/2021 | Si | H01R 12/73 |
| 2021/0231885 | A1* | 7/2021 | Ger | G02B 6/3853 |

OTHER PUBLICATIONS

Partial Search Report from European Patent Application No. 21204252. 7, dated Mar. 29, 2022, 12 pages.

* cited by examiner

*Primary Examiner* — Agustin Bello
(74) *Attorney, Agent, or Firm* — Alston & Bird LLP

(57) ABSTRACT

Apparatuses, systems, and methods are described that provide improved networking communication systems and associated adapters. An example networking communication adapter includes an adapter housing defining a first end and a second end opposite the first end. The first end is configured to engage an Octal Small Form Factor Pluggable (OSFP) connector, and the second end is configured to receive a Quad Small Form Factor Pluggable Double Density (QSFP-DD) transceiver therein. The networking communication adapter further includes an inner connector positioned within the adapter housing. In an operational configuration in which the first end engages the OSFP connector and the second end receives the QSFP-DD transceiver, the inner connector operably connects the QSFP-DD transceiver with the OSFP connector such that signals may pass therebetween.

20 Claims, 7 Drawing Sheets

NETWORKING COMMUNICATION ADAPTER

TECHNOLOGICAL FIELD

Example embodiments of the present invention relate generally to communication systems and, more particularly, to networking communication adapters.

BACKGROUND

Datacenters and other networking environments may include connections between switch systems, servers, racks, and other devices in order to provide for signal transmission between one or more of these elements. Such connections may be made using cables, transceivers, networking boxes, modules, printed circuit boards (PCBs), and connector assemblies, each of which may have a different size, shape, form factor, or the like as defined by applicable regulations or standards.

BRIEF SUMMARY

Apparatuses, systems, and associated methods of manufacturing are provided for improved networking communication systems. An example networking communication adapter may include an adapter housing defining a first end configured to engage an Octal Small Form Factor Pluggable (OSFP) connector. The adapter housing may further define a second end opposite the first end configured to receive a Quad Small Form Factor Pluggable Double Density (QSFP-DD) transceiver therein. The networking communication adapter may further include an inner connector positioned within the adapter housing and configured to, in an operational configuration in which the first end engages the OSFP connector and the second end receives the QSFP-DD transceiver, operably connect the QSFP-DD transceiver with the OSFP connector such that signals may pass therebetween.

In some embodiments, the inner connector may further include a printed circuit board (PCB) proximate the first end of the adapter housing configured to, in the operational configuration, operably connect the inner connector with the OSFP connector. In such an embodiment, the inner connector may further include a QSFP-DD connector proximate the second end of the adapter housing, configured to, in the operational configuration, operably couple the inner connector with the QSFP-DD transceiver.

In some further embodiments, the QSFP-DD connector may be configured to receive a corresponding PCB of the QSFP-DD transceiver such that the PCB of the inner connector and the PCB of the QSFP-DD transceiver are substantially aligned.

In other embodiments, the QSFP-DD connector may be configured to receive a corresponding PCB of the QSFP-DD transceiver such that the PCB of the inner connector and the PCB of the QSFP-DD transceiver are coplanar.

In some embodiments, the inner connector may further include connectivity circuitry configured to determine the presence of a noncompliant transceiver received by the second end of the adapter housing and preclude communication between the OSFP connector and the noncompliant transceiver. In such an embodiment, the noncompliant transceiver may include a Quad Small Form Factor Pluggable (QSFP), Quad Small Form Factor Pluggable+ (QSFP+), Quad Small Form Factor Pluggable 28 (QSFP28), Quad Small Form Factor Pluggable 56 (QSFP56) transceiver, or Quad Small Form Factor Pluggable 112 (QSFP112) transceiver. Some of the aforementioned transceivers may be defined by applicable multi-source agreements (MSAs) or standards. The present disclosure, however, contemplates that a noncompliant transceiver as described herein may refer to a transceiver that has the same size (e.g., form factor) and connectivity (e.g., connection pads) as a QSFP transceiver.

In some further embodiments, the QSFP-DD connector may further include a plurality of legacy connection pads and a plurality of QSFP-DD connections pads configured to, in an operational configuration, operably connect the QSFP-DD transceiver with the inner connector. In such an embodiment, the connectivity circuitry may be configured to determine the presence of the noncompliant transceiver by identifying an absence of connectivity associated with at least one QSFP-DD connection pad.

An example method for network communications is also provided. The method may include monitoring a second end of an adapter housing, wherein the second end is configured to receive a Quad Small Form Factor Pluggable Double Density (QSFP-DD) transceiver therein. The method may further include determining the presence of a noncompliant transceiver received by the second end of the adapter housing and precluding communication between the noncompliant transceiver and a first end of the adapter housing configured to engage an Octal Small Form Factor Pluggable (OSFP) connector.

In some embodiments, monitoring the second end of the adapter housing may further include monitoring a plurality of legacy connection pads and a plurality of QSFP-DD connection pads of a QSFP-DD connector positioned proximate the second end of the adapter housing.

In some further embodiments, precluding communication between the noncompliant transceiver and the first end of the adapter housing may further include grounding a connection to at least one legacy connection pad.

In any network communication method embodiment, the noncompliant transceiver may include a Quad Small Form Factor Pluggable (QSFP), Quad Small Form Factor Pluggable+(QSFP+), Quad Small Form Factor Pluggable 28 (QSFP28), or Quad Small Form Factor Pluggable 56 (QSFP56) transceiver.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As noted above and described hereafter, networking systems, such as those found in datacenters, may establish inter-rack connections between racks and intra-rack connections between networking boxes, PCBs, and the like located within the same rack. These connections often rely upon transceivers, processors, chipsets, PCBs, connectors, networking cables, and associated communication system components that are constrained by regulations (e.g., industry standards or the like) that regulate the overall size of these components, define the shape of these components, and/or specify the types of connections between components. By way of example, emerging transceivers/modules such as Octal Small Form Factor Pluggable (OSFP) and Quad Small Form Factor Pluggable Double Density (QSFP-DD) transceivers/modules employ eight (8) high speed electrical lanes that increase system bandwidth and data transmission as compared to prior legacy transceivers/modules. OSFP connectors are configured to engage an OSFP transceiver/module and are dimensioned (e.g., sized and shaped) according to associated OSFP regulations. QSFP-DD transceivers/modules are also dimensioned (e.g., sized and shaped) according to associated QSFP-DD regulations, resulting in a different size and form factor as between OSFP and QSFP-DD transceivers/modules. The size of an OSFP connector, for example, is wider and deeper than that of a QSDP-DD transceiver/module, resulting in connector interfacing issues in networking environments. In order to address these issues and others, the devices of the present disclosure provide a networking communication adapter that physically and electrically connects an OSFP connector and a QSFP-DD transceiver such that signals may pass therebetween.

Furthermore, QSFP-DD connectors may also provide for backwards compatibility in that legacy transceivers (e.g., prior hardware components that have been superseded in functionality) may be physically inserted into a QSFP-DD connector and may be operable. By way of example, Quad Small Form Factor Pluggable (QSFP), Quad Small Form Factor Pluggable+ (QSFP+), Quad Small Form Factor Pluggable 28 (QSFP28), and Quad Small Form Factor Pluggable 56 (QSFP56) transceivers employ four (4) high speed electrical lanes but may be received by a QSFP-DD connector and operate with these four (4) electrical lanes. Although operable, receipt of a legacy transceiver/module (e.g., QSFP, QSFP+, QSFP28, QSFP56, etc.) by a QSFP-DD connector results in a reduced operating capacity for the QSFP-DD connector due to utilization of only a subset of available connection pads offered by the QSFP-DD connector. Said differently, the backwards compatibility of current QSFP-DD connectors may result in reduced bandwidth in networking applications by underutilizing available connectivity resources. In order to address these issues and others, the devices of the present disclosure provide connectivity circuitry disposed within the networking communication adapter that identifies a noncompliant transceiver/module (e.g., a suboptimal legacy transceiver) and precludes operation of the networking communication adapter with the noncompliant transceiver/module. In doing so, the embodiments of the present application may reduce the inefficiencies of traditional networking connections while also providing new functionality associated with adapting OSFP and QSFP-DD connections.

Although described herein with reference to a network connection between a QSFP-DD transceiver and an OSFP connector, the present disclosure contemplates that the features and functionality described herein may also be applicable to adapters used with connections between other types of transceivers and connectors. By way of example, an adapter configured to receive a small form factor pluggable double density (SFP-DD) transceiver would necessarily prevent operation with a QSFP transceiver (e.g., a noncompliant transceiver) due to the physical differences (e.g., different form factors) between these types of connections. Said differently, a QSFP transceiver may not be physically or electrically connected with an SFP-DD connector. The present disclosure, however, contemplates that an adapter for use with, for example, an SFP-DD transceiver may similarly be configured as described herein to preclude operation of such an adapter with a noncompliant transceiver (e.g., any transceiver other than an SFP-DD transceiver).

Networking Communication Adapter

Figures 1A, 1B:
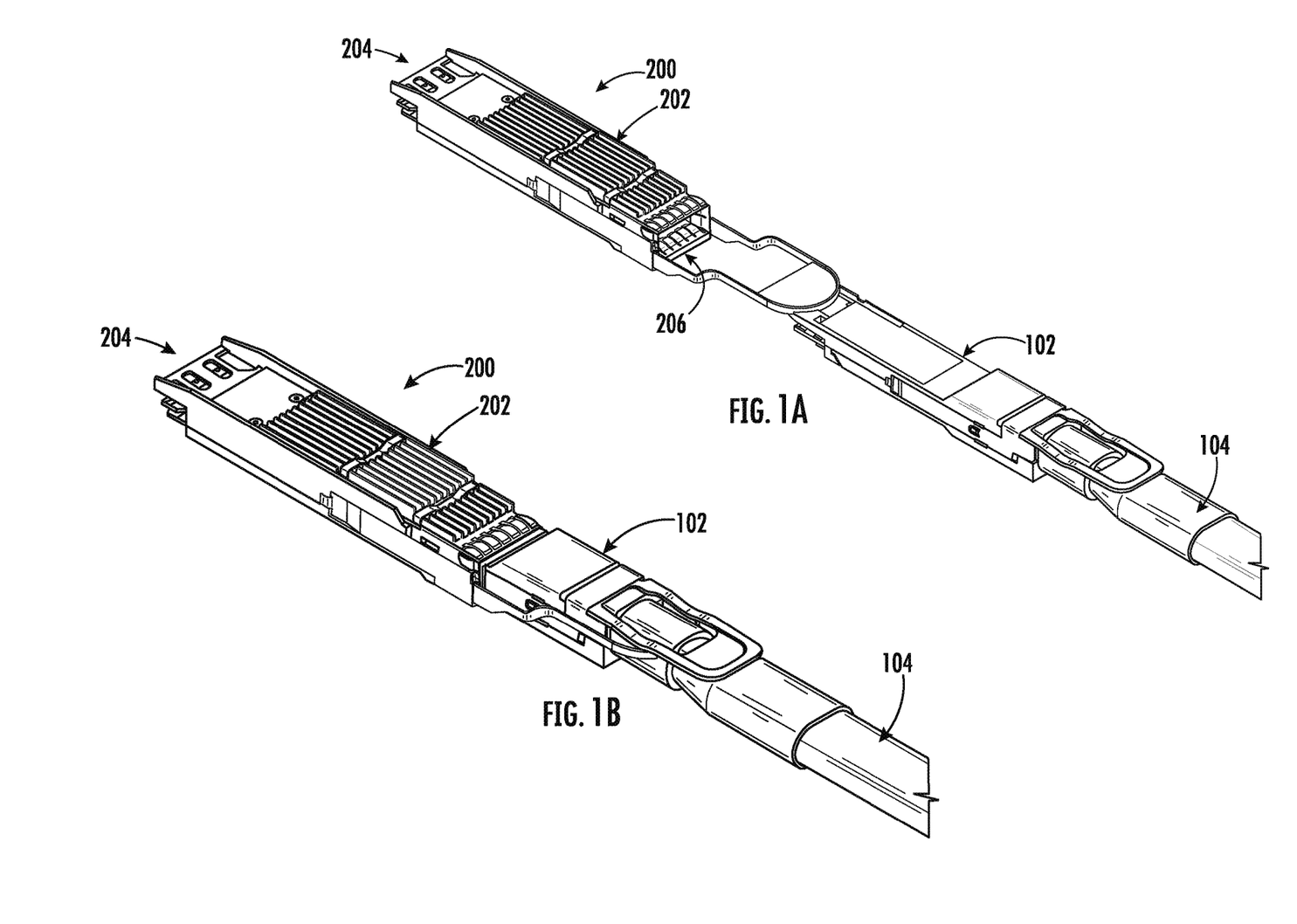
FIGS. 1A-1B are perspective views of a networking communication adapter according to an example embodiment.

With reference to FIGS. 1A-1B, a networking system 100 is illustrated. As shown, the example networking system 100 may include a networking communication adapter 200, a QSFP-DD transceiver 102, and associated networking cable 104. As described hereafter with reference to FIGS. 2-3, the networking communication adapter 200 (e.g., adapter 200) may include an adapter housing 202 that defines a first end 204 and a second end 206 opposite the first end 204. The first end 204 may be configured to engage or otherwise physically connect the adapter housing 202 with an OSFP connector (not shown). As described above, applicable OSFP regulations or standards may define the physical dimensions, size, and shape of OSFP transceiver/modules and associated OSFP connectors configured to receive OSFP transceiver/modules. As such, the first end 204 of the adapter housing 202 may be dimensioned (e.g., sized and shaped) to comply with the regulations or standards that govern OSFP connections. In an operational configuration, the first end 204 may provide physical engagement between the adapter housing 202 and an OSFP connector (not shown).

With continued reference to FIGS. 1A-1B, the second end 206 of the adapter housing 202 may be configured to engage or otherwise physically connect the adapter housing 202 with an QSFP-DD transceiver 102. In particular, the second end 206 of the adapter housing 202 may be configured to receive the QSFP-DD transceiver 102 inserted therein. As described above, applicable QSFP-DD regulations or standards may define the physical dimensions, size, and shape of QSFP-DD transceiver/modules and associated QSFP-DD connectors configured to receive QSFP-DD transceiver/modules. As such, the second end 206 of the adapter housing 202 may be dimensioned (e.g., sized and shaped) to comply with the regulations or standards that govern QSFP-DD connections. As shown in FIG. 1A, the QSFP-DD transceiver 102 may include a networking cable 104 (e.g., transmission medium) attached thereto so as to provide signal transmission between the networking communication adapter 200 and components (not shown) positioned on opposite ends of the networking cable 104. In an operational configuration, as shown in FIG. 1B, the second end 206 may provide physical engagement between the adapter housing 202 and the QSFP-DD transceiver 102.

Figure 2:
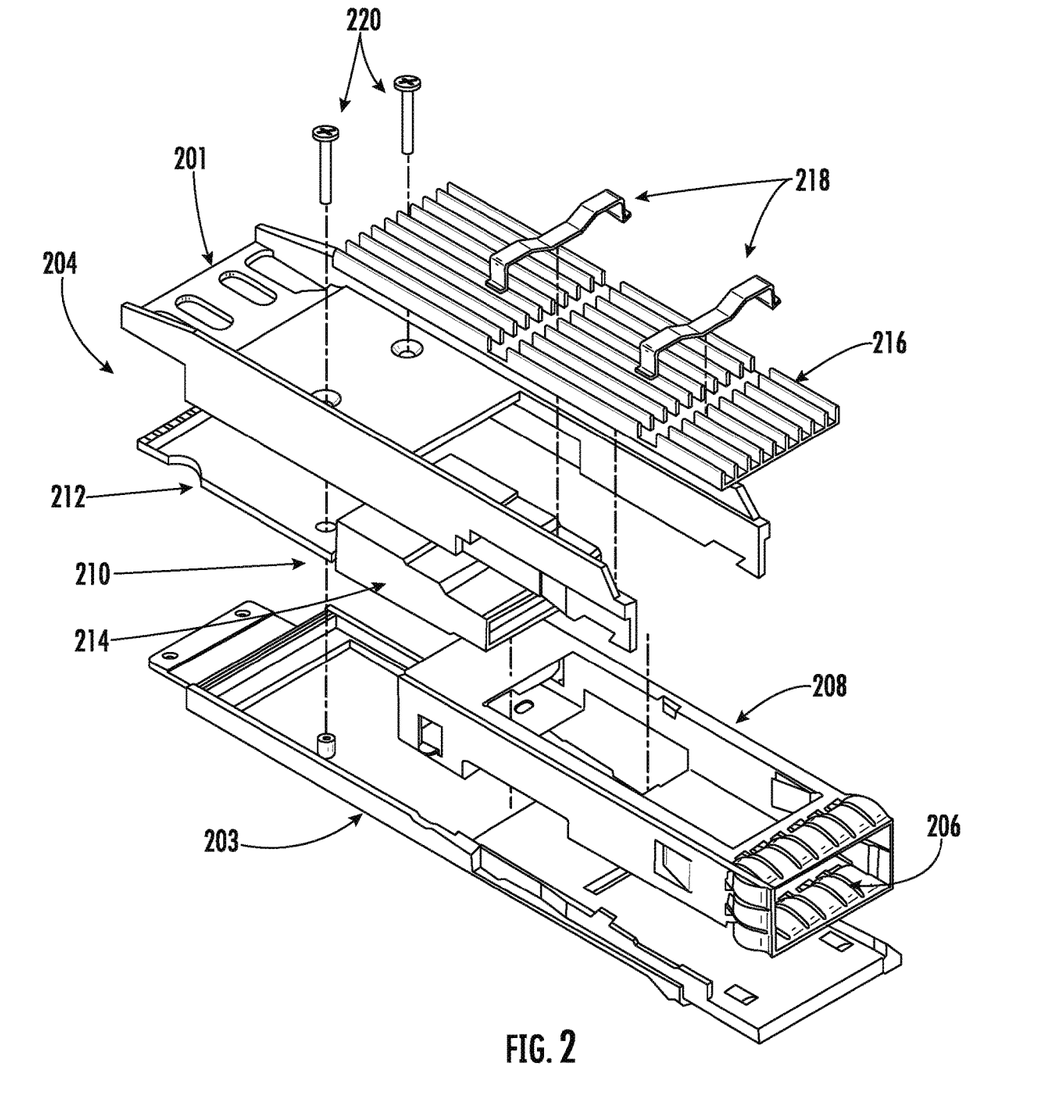
FIG. 2 is an exploded view of the networking communication adapter of FIGS. 1A-1B according to an example embodiment.
Figure 3:
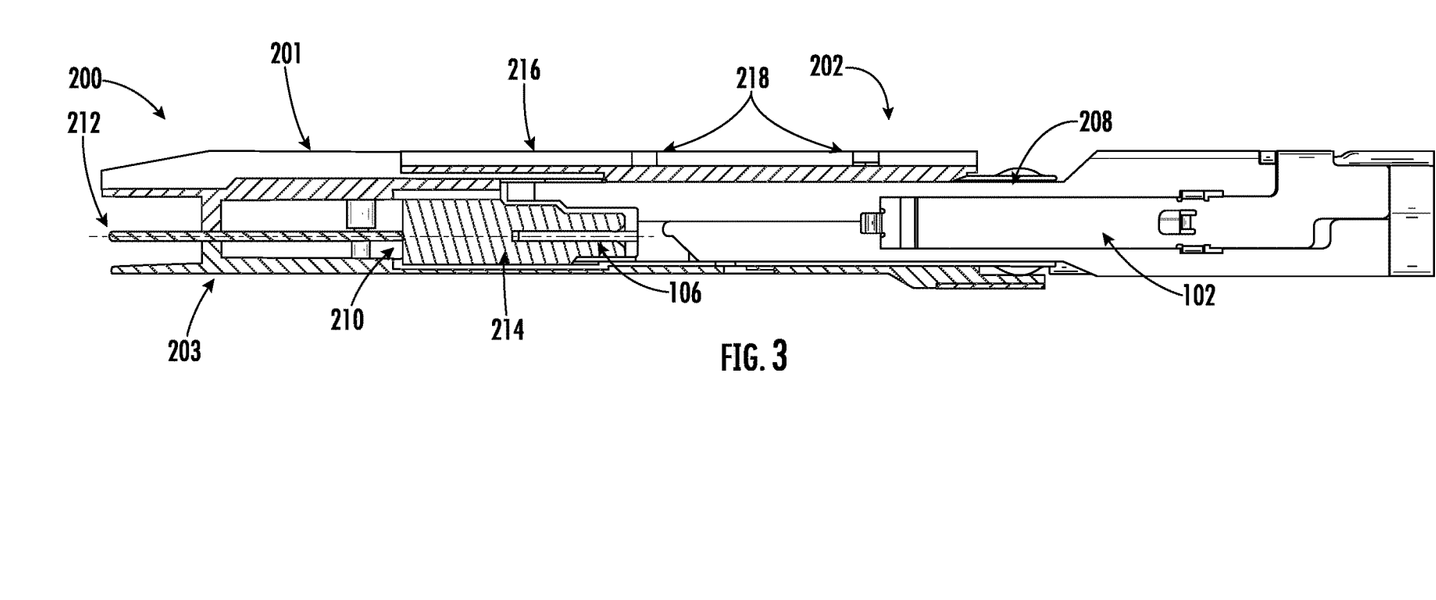
FIG. 3 is a cross-sectional view of the networking communication adapter of FIG. 1B according to an example embodiment.

With reference to FIGS. 2-3, exploded and cross-sectional views, respectively, of the networking communication adapter 200 are illustrated. As shown, the adapter housing 202 may, in some embodiments, include a bottom backshell 203, a top backshell 201, and an inner cage 208. The bottom backshell 203 may engage or otherwise connect with the top backshell 201 to substantially enclose the components described herein. The combined bottom backshell 203 and top backshell 201 may further support the inner cage 208 within the adapter housing 202. The inner cage 208 may be configured to, in the operational configuration illustrated in FIGS. 1B and 3, support at least a portion of the QSFP-DD transceiver 102 within the adapter housing 202. As such, the inner cage 208 may be dimensioned (e.g., sized and shaped) as defined by applicable regulations and standards to receive a QSFP-DD transceiver 102 therein. The bottom backshell 203 and the top backshell 201 may be connected via one or more engagement elements (e.g., screws, tabs, fasteners, or the like). Although illustrated with two (2) threaded elements (e.g., screws), the present disclosure contemplates that any mechanism or element configured to secure the bottom backshell 203 to the top backshell 201 may be used based upon the intended application of the adapter housing 202.

The network communication adapter 200 may further include a heat sink 216 and spring members 218 configured to dissipate heat generated by the networking components described herein. The heat sink 216 may define a plurality of fins, pins, or other heat dissipation elements that, in some embodiments, extend along a length of the heat sink 216. The spring members 218 may be configured to secure the heat sink 216 to the top backshell 201 and may further urge contact between the heat sink 216 and the QSFP-DD transceiver 102 received by the adapter housing 202 via the second end 206. By way of example, in the operational configuration, the QSFP-DD transceiver 102 within the adapter housing 202, other circuitry components (e.g., connectivity circuitry described hereafter), and/or engagement with the OSFP connector (not shown) may generate heat during performance of the operations described herein. As such, the heat sink 216 may serve to dissipate heat generated by these components in order to reduce the thermal load of the components. Although illustrated and described herein with reference to a heat sink 216 that defines a plurality of longitudinal fins, the present disclosure contemplates that any heat dissipation element or form of heat dissipation (e.g., conductive, convective, etc.) may be used by the networking communication adapter 200.

With continued reference to FIGS. 2-3, the networking communication adapter 200 may include an inner connector 210 positioned within the adapter housing 202. The inner connector 210 may, in the operational configuration in which the first end 204 engages the OSFP connector (not shown) and the second end 206 receives the QSFP-DD transceiver 102, operably connect the QSFP-DD transceiver 102 with the OSFP connector (not shown) such that signals may pass therebetween. The adapter housing 202 may provide for the physical connection between the OSFP connector (not shown) and the QSFP-DD transceiver 102, but the inner connector 210 may electrically connect these components for signal transmission.

The inner connector 210 may include a printed circuit board (PCB) 212 proximate the first end 204 of the adapter housing 202. In an instance in which the first end 204 of the adapter housing 202 engages the OSFP connector (not shown), the PCB 212 may be configured to operably connect the inner connecter 210 with the OSFP connector (not shown). By way of example, the PCB 212 may define a plurality of electrical contacts, connection pads, traces, or the like configured to provide electrical communication between the PCB 212 and the OSFP connector (not shown) in the operational configuration. The PCB 212 may further be positioned by the inner connector 210 proximate the first end 204 of the adapter housing 202 so as to be received by or otherwise electrically connect with corresponding electrical contacts, connection pads, traces, or the like of the OSFP connector (not shown). Said differently, the physical engagement between the first end 204 of the adapter housing 202 and the OSFP connector (not shown) positions the PCB 212 of the inner connector 210 for receipt by a corresponding connection of the OSFP connector (not shown).

Figure 4A:
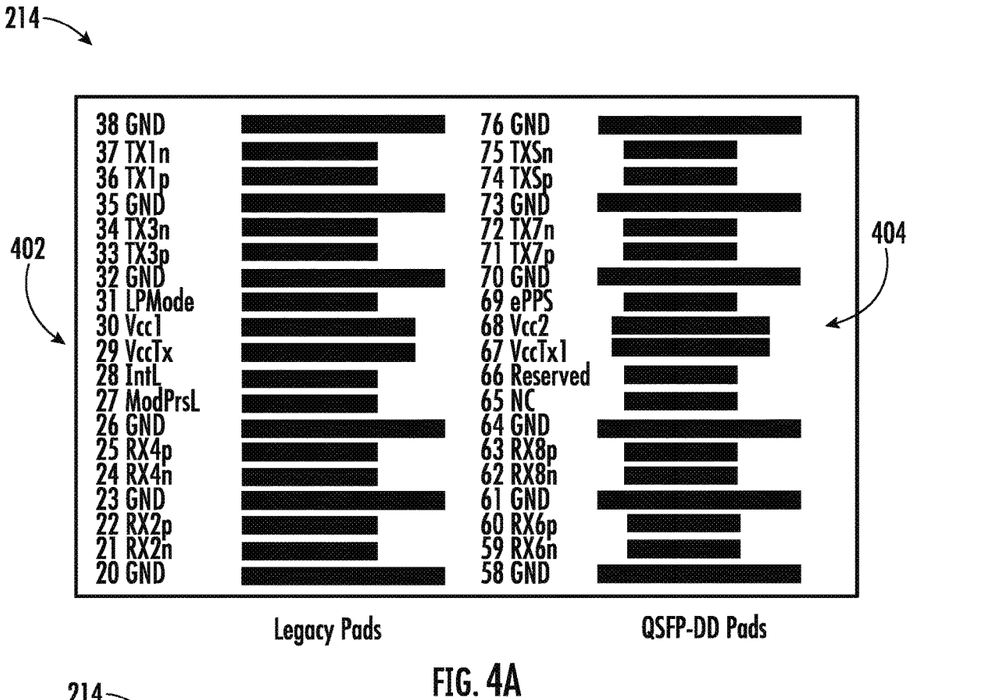
FIGS. 4A-4B are top and bottom views, respectively, illustrating connection pads of a QSFP-DD connector according to an example embodiment.
Figure 4B:
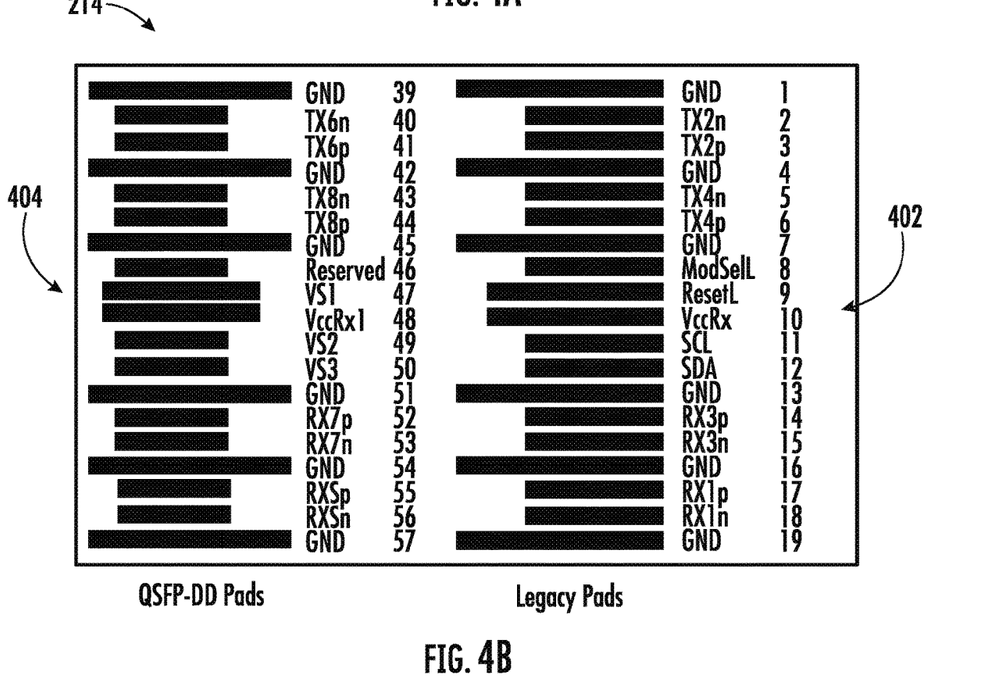

The inner connector may further include a QSFP-DD connector 214 proximate the second end 206 of the adapter housing 202, configured to, in the operational configuration, operably couple the inner connector 210 with the QSFP-DD transceiver 102. In an instance in which the second end 206 of the adapter housing 202 receives the QSFP-DD transceiver 102 as illustrated in FIG. 3, the QSFP-DD connector 214 may be configured to operably connect the inner connector 210 with the QSFP-DD transceiver 102. By way of example, the QSFP-DD connector 214 may include a plurality of electrical connection pads as illustrated in FIGS. 4A-4B configured to provide electrical communication between the QSFP-DD connector 214 and the QSFP-DD transceiver 102. The QSFP-DD connector 214 may be at least partially disposed within the inner cage 208 proximate the second end 206 of the adapter housing 202 such that physical engagement between the second end 206 of the adapter housing 202 (e.g., the inner cage 208) and the QSFP-DD transceiver 102 positions the QSFP-DD connector 214 of the inner connector 210 for receipt of a corresponding printed circuit board (PCB) 106 of the QSFP-DD transceiver 102. As described hereafter with reference to FIGS. 4A-4B, the QSFP-DD connector 214 may define a plurality of connection pads on opposite surfaces (e.g., a top and bottom surface) of the QSFP-DD connector 214 so as to electrically connect with opposing sides of the PCB 106 of the QSFP-DD transceiver 102 received therein.

In some embodiments, as shown in FIG. 3, the QSFP-DD connector 214 may be configured to receive the corresponding PCB 106 of the QSFP-DD transceiver 102 such that the PCB 212 of the inner connector 210 and the PCB 106 of the QSFP-DD transceiver 102 are substantially aligned. In conventional networking connections, the dimensions specified by applicable standards or regulations often result in misalignment between PCBs (e.g., PCBs located at differing heights within a housing) such that additional components are necessary to electrically connect these PCBs. By way of example, the dimensions of a QSFP module (e.g., a legacy transceiver) as defined by associated QSFP standards results in a height discrepancy or misalignment between the PCB of the legacy transceiver and the PCB of an associated connector. In order to bridge this discrepancy, traditional networking connections have relied upon flexible circuit boards, stepped/milled circuit boards, and/or additional specialized cables. Each of these conventional techniques, however, increase the overall cost of the networking component while further introducing additional modes of failure. The networking communication adapter 200 described herein, however, is configured to position these respective PCBs (e.g., PCB 212 of the inner connector 210 and the PCB 106 of the QSFP-DD transceiver 102) in alignment (e.g., without a difference in height). In doing so, the networking communication adapter 200 may remove the need for additional networking components within the adapter housing 202.

As noted above, in some embodiments, the QSFP-DD connector 214 is configured to receive a corresponding PCB 106 of the QSFP-DD transceiver 102 such that the PCB 212 of the inner connector 210 and the PCB 106 of the QSFP-DD transceiver 106 are substantially aligned. As described herein, substantial alignment may refer to placement of the PCB 106 and the PCB 212 along a common line (e.g., at the same height). In some further embodiments, the QSFP-DD connector 214 may be configured to receive the corresponding PCB 106 of the QSFP-DD transceiver 102 more exactly, such that the PCB 212 of the inner connector 210 and the PCB 106 of the QSFP-DD transceiver 102 are coplanar. As described herein, coplanar may refer to the positioning of PCB 106 and the PCB 212 in a common plane. In order to provide this improved alignment, the networking communication adapter 200 described herein may, in some instances, be configured such that the QSFP-DD transceiver 102 received by the second end 206 of the adapter housing 202 extends beyond an outer edge of the second end 206 as shown in FIG. 3. Said differently, the inner cage 208, inner connector 210, and/or second end 206 may be dimensioned such that at least a portion of the QSFP-DD transceiver 102 is disposed outside of the adapter housing 202. In doing so, the networking communication adapter 200 may ensure the necessary space within the adapter housing 202 to provide substantial alignment, and in some cases coplanar alignment, between the PCB 106 and the PCB 212.

With reference to FIGS. 4A-4B, top and bottom views, respectively, of connection pads of the QSFP-DD connector 214 are illustrated. As shown, each major surface of the QSFP-DD connector 214 may include a plurality of legacy connection pads 402 and a plurality of QSFP-DD connection pads 404. The plurality of legacy connections pads 402 may be configured to operably connect a plurality of transmission channels (e.g., four (4) electrical channels found in QSFP-DD transceivers and legacy transceivers) of the QSFP-DD transceiver 102 with the inner connector 210. The plurality of QSFP-DD connections 404 may be configured to operably connect a plurality of transmission channels (e.g., four (4) electrical channels found only in QSFP-DD transceivers) of the QSFP-DD transceiver 102 with the inner connector 210. Notwithstanding the connection preclusion techniques described hereafter, insertion of a legacy transceiver (e.g., a QSFP transceiver, a QSFP+ transceiver, a QSFP28 transceiver, or a QSFP56 transceiver) results in connection with only the plurality of legacy connection pads 402. Said differently, legacy transceivers fail to include transmission lanes for connecting with the QSFP-DD pads 404.

As described hereafter with reference to an example network communication and associated connection preclusion, the inner connector 210 may further include connectivity circuitry configured to, in the operational configuration, enable signal transmission between the OSFP connector (not shown) and the QSFP-DD transceiver 102. In some instances, the signals transmitted by the QSFP-DD transceiver 102 and the OSFP connector may be of a matching type, encoding, encryption, or the like such that the connectivity circuitry includes passive circuitry elements (e.g., electrical connections, traces, etc.) configured to direct electrical signals between the OSFP connector (not shown) and the QSFP-DD transceiver 102.

In other embodiments, the signals transmitted between the QSFP-DD transceiver 102 and the OSFP connector (not shown) may utilize different forms of encoding such that the connectivity circuitry may include active circuitry (e.g., a controller, a computing device, etc.) configured to convert between these signals to operably connect the OSFP connector (not shown) and the QSFP-DD transceiver 102. In such an embodiment, the connectivity circuitry may be embodied in any number of different ways and may, for example, include one or more processing devices configured to perform independently. Furthermore, the connectivity circuitry (e.g., controller) may be understood to include a single core processor, a multi-core processor, and/or the like. By way of example, the connectivity circuitry (e.g. controller) may be configured to execute instructions stored in a memory or otherwise accessible to one or more processors of the connectivity circuitry (e.g. controller). Alternatively or additionally, the connectivity circuitry (e.g. controller) may be configured to execute hard-coded functionality. As such, whether configured by hardware or by a combination of hardware with software, the connectivity circuitry (e.g. controller) may represent an entity (e.g., physically embodied in circuitry) capable of performing operations according to an embodiment of the present invention while configured accordingly.

Example Methods for Network Communication

Figure 5:
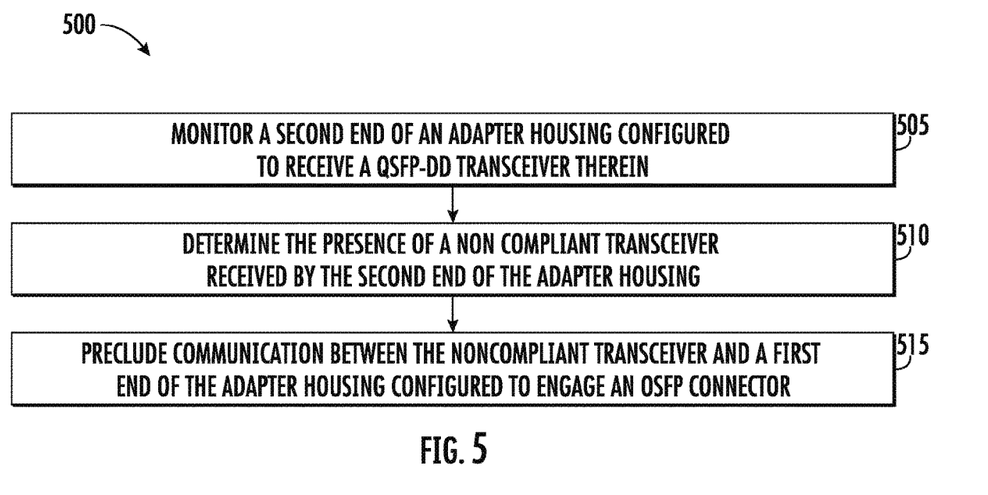
FIG. 5 is a flowchart illustrating an example method for network communications according to an example embodiment.

With reference to FIG. 5, a method for network communication and connection preclusion is illustrated. The method (e.g., method 500) may include the step of monitoring, via the connectivity circuitry, a second end 206 of the adapter housing 202 that receives the QSFP-DD transceiver 102 therein at operation 505. As described above, the inner connector 210 may include connectivity circuitry configured to, in the operational configuration, operably connect the OSFP connector (not shown) and the QSFP-DD transceiver 102 such that signals may flow therebetween. In some instances, the connectivity circuitry may include passive circuitry elements (e.g., electrical connections, traces, etc.) configured to direct electrical signals. In such an embodiment, the monitoring by the connectivity circuitry at operation 502 may refer to the identification of electrical signals within the plurality of legacy connection pads 402 and/or plurality of QSFP-DD connection pads 404. Said differently, operation 505, in some embodiments, may be responsive to the receipt of a QSFP transceiver (or noncompliant transceiver as described hereafter) in that the passive connectivity circuitry components monitor the second end 206 of the adapter housing 202 by determining the presence of electrical signals received from the QSFP-DD connector 214. In instances in which the connectivity circuitry includes active circuitry elements (e.g., a controller), operation 505 may refer to interrogatory signal(s) transmitted by the connectivity circuitry to the QSFP-DD connector 214 in order to monitor the second end 206 of the adapter housing 202.

The method 500 may include the step of determining, the connectivity circuitry, the con the presence of a noncompliant transceiver received by the second end 206 of the adapter housing 202 at operation 510. As described above, the backwards compatibility of QSFP-DD connectors allows for legacy transceivers (e.g., prior hardware components that have been superseded in functionality) to be physically inserted into a QSFP-DD connector 214 in an operable fashion. These legacy transceivers, however, are noncompliant transceivers in that they result in reduced bandwidth for the networking communication adapter 200 due to the ability to only utilize four (4) of the available eight (8) transmission lanes. Noncompliant transceivers may include, for example, QSFP transceivers, QSFP+ transceivers, QSFP28 transceivers, and QSFP56 transceivers. At operation 510, the connectivity circuitry may be configured to identify the presence of a noncompliant transceiver received by the second end 206 by identifying an absence of connectivity associated with at least one QSFP-DD connection pad 404.

By way of example, a QSFP transceiver may be physically inserted into the adapter housing 202 via the second end 206 and connect with one or more of the legacy connection pads 402. Due to the reduced number of electrical transmission lanes; however, the QSFP transceiver is unable to connect to the QSFP-DD connection pads 404. Furthermore, the length of these noncompliant or legacy transceivers (e.g., QSFP, QSFP+, QSFP28, QSFP56, etc.) is reduced due to the lack of additional electrical transmission lanes associated with QSFP-DD transceivers such that the noncompliant or legacy transceiver is unable to electrically connect with the QSFP-DD connection pads 404 when received by the second end 206. As such, the determination at operation 510 may include identifying the absence of connectivity (e.g., an absence of electrical signals, current, etc.) with at least one QSFP-DD connection pad 404 indicating that the transceiver received by the second end of the adapter housing 202 is not a QSFP-DD transceiver 102 (e.g., is a noncompliant transceiver).

With reference to operation 515, the method 500 may include the step of precluding, via the connectivity circuitry, communication between the noncompliant transceiver determined at operation 510 and a first end 204 of the adapter housing 202 that engages the OSFP connector (not shown). In some embodiments, the connectivity circuitry may be configured to ground a connection to at least one legacy connection pad 402, thereby preventing power to the noncompliant transceiver identified at operation 510. In an instance in which the connectivity circuitry includes passive circuitry elements (e.g., electrical connections, traces, etc.), the connectivity circuitry may include resistors, capacitors, and/or other circuitry components configured to ground the connection of the noncompliant transceiver. By way of example, the absence of an electrical connection with any of the plurality of QSFP-DD connection pads 404 may be such that the electrical circuitry of the inner connector 210 is open (e.g., incomplete such that current may not flow within the open circuit). In instances in which the connectivity circuitry includes active circuitry components (e.g., a controller, processor, etc.), the connectivity circuitry may preclude communication between the noncompliant transceiver and the first end 204 of the adapter housing 202 by preventing signals from passing therebetween. For example, a microcontroller may iteratively (e.g., at a detection frequency) monitor the connections with the inner connector 210 (e.g., transmit an interrogatory signal or the like) to determine the presence of a noncompliant transceiver as described herein.

Although described herein with reference to grounding the connection to at least one legacy connection pad 402, the present disclosure contemplates that other mechanisms may similarly be used to prevent communication between a noncompliant transceiver and the first end 204 of the adapter housing 202. By way of example, the connectivity circuitry may be configured to hold the connection in reset, remove power to the adapter 200 (in whole or in part), preclude operation of a communication bus, and/or the like. Said differently, the connectivity circuitry described herein may be configured to employ any mechanism for preventing communication of the adapter 200 in an instance in which a noncompliant transceiver is received.

Figure 6:
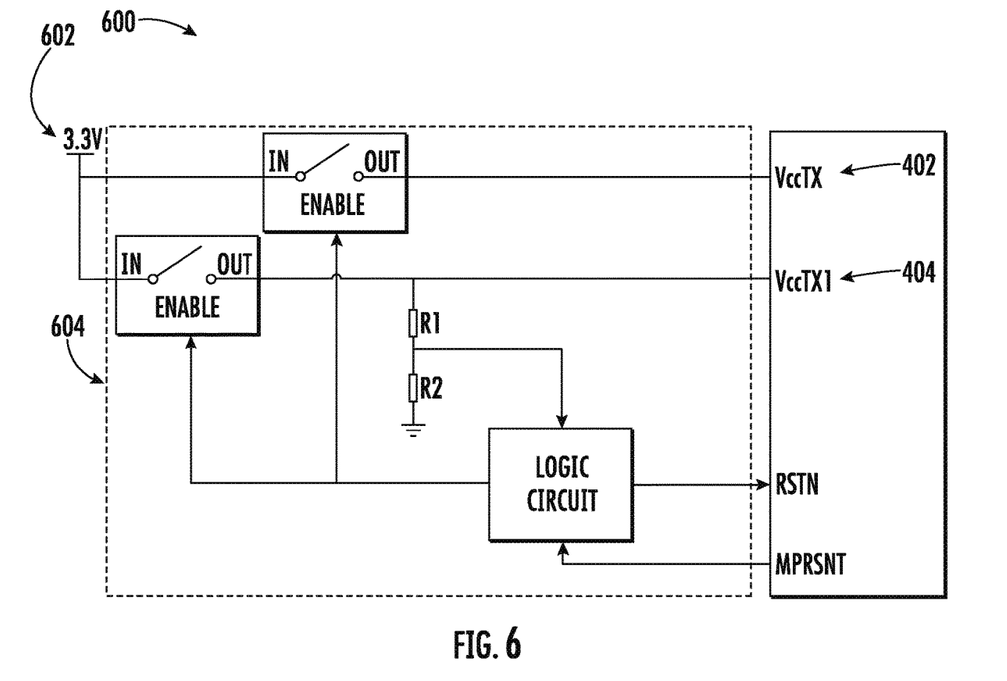
FIG. 6 is a circuitry diagram of example connectivity circuitry according to an example embodiment.

With reference to FIG. 6, an example circuitry diagram 600 of example connectivity circuitry is illustrated. As shown, a power input 602 of, for example, 3.3 V is provided to the connectivity circuitry. The circuitry 600 includes an example legacy connection pad 402 and an example QSFP-DD pad 404. In such an embodiment, the connectivity circuitry may include logic components 604 that are configured to determine the absence of connectivity associated with the QSFP-DD connection pad 404 in order to determine the presence of a noncompliant transceiver due to the inability of noncompliant transceivers to electrically engage with the plurality of QSFP-DD connection pads 404. The logic components 604 may be configured to preclude communication between the first end 204 (and the OSFP connector engaged therewith) and the noncompliant transceiver by resetting or otherwise grounding the circuitry 600 such that electrical signals are unable to pass therethrough. In doing so, the connectivity circuitry of the inner connector 210, for example circuitry 600, may prevent the inefficiencies associated with connecting legacy transceiver modules with emerging high bandwidth connectivity solutions. Said differently, method 500 and example circuitry 600 may operate to indicate, to an operator or otherwise, the presence of a noncompliant transceiver and prompt such an operator to replace the noncompliant transceiver with a QSFP-DD transceiver.

Example Method of Manufacture

Figure 7:
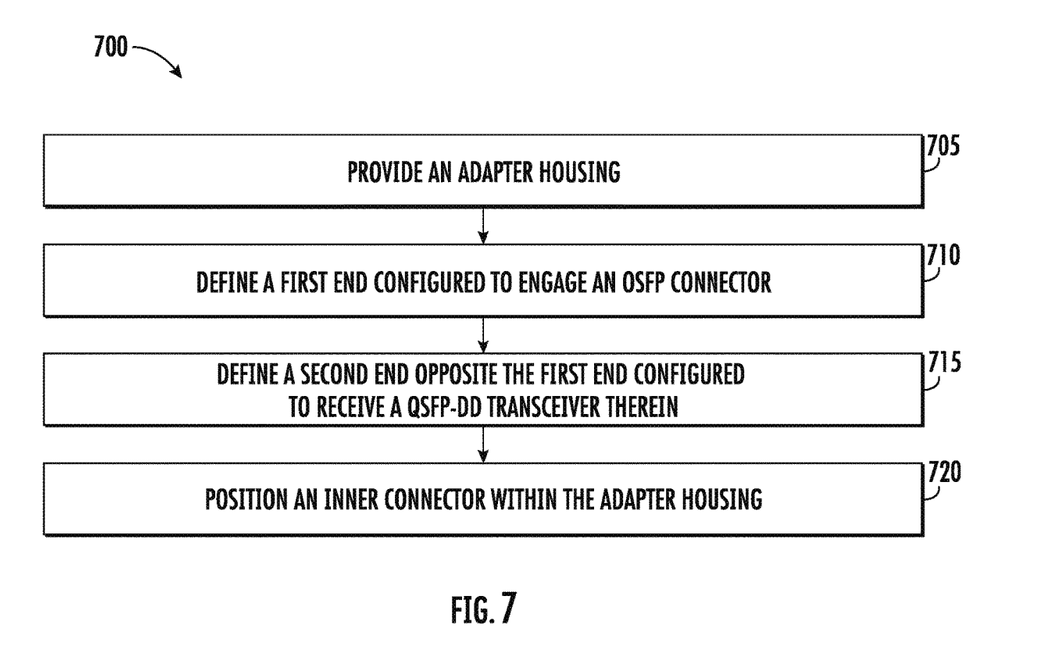
FIG. 7 is a flowchart illustrating a method of manufacturing a networking communication adapter according to an example embodiment.

With reference to FIG. 7, a method of manufacturing a networking communication adapter according to embodiments of the present disclosure is illustrated. The method (e.g., method 700) may include the step of providing an adapter housing at operation 705. As described above, the adapter housing 202 may, in some embodiments, be formed of a bottom backshell 203, a top backshell 201, and an inner cage 208. The bottom backshell 203 may engage or otherwise connect with the top backshell 201 to substantially enclose the components described herein. The combined bottom backshell 203 and top backshell 201 may further support the inner cage 208 within the adapter housing 202.

In other embodiments, the adapter housing 202 may be formed of a single piece of material. The adapter housing may be formed by any method (e.g., extrusion, machining, injection molding, casting, etc.) and may similarly be formed of any material used in networking communication systems (e.g., metals, polymers, alloys, etc.).

The method 700 may also include defining a first end configured to engage an OSFP connection at operation 710. As described above, the first end 204 may be configured to engage or otherwise physically connect the adapter housing 202 with an OSFP connector. Applicable OSFP regulations or standards may define the physical dimensions, size, and shape of OSFP transceiver/modules and associated OSFP connectors configured to receive OSFP transceiver/modules. As such, the first end 204 of the adapter housing 202 may be dimensioned (e.g., sized and shaped) to comply with the regulations or standards that govern OSFP connections. In an operational configuration, the first end 204 may provide physical engagement between the adapter housing 202 and an OSFP connector (not shown).

The method 700 may also include defining a second end opposite the first end configured to receive a QSFP-DD transceiver therein at operation 715. The second end 206 of the adapter housing 202 may be configured to engage or otherwise physically connect the adapter housing 202 with an QSFP-DD transceiver 102. In particular, the second end 206 of the adapter housing 202 may be configured to receive the QSFP-DD transceiver 102 inserted therein. As described above, applicable QSFP-DD regulations or standards may define the physical dimensions, size, and shape of QSFP-DD transceiver/modules and associated QSFP-DD connectors configured to receive QSFP-DD transceiver/modules. As such, the second end 206 of the adapter housing 202 may be dimensioned (e.g., sized and shaped) to comply with the regulations or standards that govern QSFP-DD connections. In an operational configuration, the second end 206 may provide physical engagement between the adapter housing 202 and the QSFP-DD transceiver 102.

The method 700 may also include positioning an inner connector within the adapter housing at operation 720. The inner connector 210 may include a printed circuit board (PCB) 212 proximate the first end 204 of the adapter housing 202. In an instance in which the first end 204 of the adapter housing 202 engages the OSFP connector (not shown), the PCB 212 may be configured to operably connect the inner connecter 210 with the OSFP connector (not shown). The PCB 212 may further be positioned by the inner connector 210 proximate the first end 204 of the adapter housing 202 so as to electrically connect with corresponding electrical contacts, connection pads, traces, or the like of an OSFP connector (not shown). Said differently, the physical engagement between the first end 204 of the adapter housing 202 and the OSFP connector (not shown) positions the PCB 212 of the inner connector 210 for engagement with a corresponding connection of the OSFP connector (not shown).

The inner connector may further include a QSFP-DD connector 214 proximate the second end 206 of the adapter housing 202, configured to, in the operational configuration, operably couple the inner connector 210 with the QSFP-DD transceiver 102. In an instance in which the second end 206 of the adapter housing 202 receives the QSFP-DD transceiver 102, QSFP-DD connector 214 may be configured to operably connect the inner connector 210 with the QSFP-DD transceiver 102. The QSFP-DD connector 214 may be at least partially disposed within the inner cage 208 proximate the second end 206 of the adapter housing such that physical engagement between the second end 206 of the adapter housing 202 (e.g., the inner cage 208) and the QSFP-DD transceiver 102 positions the QSFP-DD connector 214 of the inner connector 210 for receipt of a corresponding printed circuit board (PCB) 106 of the QSFP-DD transceiver 102. As described above, the inner connector 210 may be defined so such that the QSFP-DD connector 214 is configured to receive a corresponding PCB 106 of the QSFP-DD transceiver 102 such that the PCB 214 of the inner connector 210 and the PCB 106 of the QSFP-DD transceiver 102 are substantially aligned or are further coplanar.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A networking communication adapter comprising:
an adapter housing defining:
a first end configured to engage an Octal Small Form Factor Pluggable (OSFP) connector; and
a second end opposite the first end configured to receive a Quad Small Form Factor Pluggable Double Density (QSFP-DD) transceiver therein; and
an inner connector positioned within the adapter housing and configured to, in an operational configuration in which the first end engages the OSFP connector and the second end receives the QSFP-DD transceiver, operably connect the QSFP-DD transceiver with the OSFP connector such that signals may pass therebetween, the inner connector comprising:
a printed circuit board (PCB) proximate the first end of the adapter housing configured to, in the operational configuration, operably connect the inner connector with the OSFP connector;
a QSFP-DD connector proximate the second end of the adapter housing configured to, in the operational configuration, operably couple the inner connector with the QSFP-DD transceiver; and
connectivity circuitry configured to determine the presence of a noncompliant transceiver received by the second end of the adapter housing and preclude communication between the OSFP connector and the noncompliant transceiver.

2. The networking communication adapter according to claim 1, wherein the QSFP-DD connector is configured to receive a corresponding PCB of the QSFP-DD transceiver such that the PCB of the inner connector and the PCB of the QSFP-DD transceiver are substantially aligned.

3. The networking communication adapter according to claim 1, wherein the QSFP-DD connector is configured to receive a corresponding PCB of the QSFP-DD transceiver such that the PCB of the inner connector and the PCB of the QSFP-DD transceiver are coplanar.

4. The networking communication adapter according to claim 1, wherein the noncompliant transceiver comprises a Quad Small Form Factor Pluggable (QSFP), Quad Small Form Factor Pluggable+ (QSFP+), Quad Small Form Factor Pluggable 28 (QSFP28), or Quad Small Form Factor Pluggable 56 (QSFP56) transceiver, Quad Small Form Factor Pluggable 112 (QSFP112) transceiver.

5. The networking communication adapter according to claim 1, wherein the QSFP-DD connector further comprises a plurality of legacy connection pads and a plurality of QSFP-DD connections pads configured to, in an operational configuration, operably connect the QSFP-DD transceiver with the inner connector.

6. The networking communication adapter according to claim 5, wherein the connectivity circuitry is configured to determine the presence of the noncompliant transceiver by identifying an absence of connectivity associated with at least one QSFP-DD connection pad.

7. A method of manufacturing a networking communication adapter, the method comprising:
provviding an adapter housing defining:
a first end configured to engage an Octal Small Form Factor Pluggable (OSFP) connector; and
a second end opposite the first end configured to receive a Quad Small Form Factor Pluggable Double Density (QSFP-DD) transceiver therein; and
positioning an inner connector within the adapter housing configured to, in an operational configuration in which the first end engages the OSFP connector and the second end receives the QSFP-DD transceiver, operably connect the QSFP-DD transceiver with the OSFP connector such that signals may pass therebetween, the inner connector comprising:
a printed circuit board (PCB) proximate the first end of the adapter housing configured to, in the operational configuration, operably connect the inner connector with the OSFP connector;
a QSFP-DD connector proximate the second end of the adapter housing configured to, in the operational configuration, operably couple the inner connector with the QSFP-DD transceiver; and
connectivity circuitry configured to determine the presence of a noncompliant transceiver received by the second end of the adapter housing and preclude communication between the OSFP connector and the noncompliant transceiver.

8. The method according to claim 7, wherein the QSFP-DD connector is configured to receive a corresponding PCB of the QSFP-DD transceiver such that the PCB of the inner connector and the PCB of the QSFP-DD transceiver are substantially aligned.

9. The method according to claim 7, wherein the QSFP-DD connector is configured to receive a corresponding PCB of the QSFP-DD transceiver such that the PCB of the inner connector and the PCB of the QSFP-DD transceiver are coplanar.

10. The method according to claim 7, wherein the noncompliant transceiver comprises a Quad Small Form Factor Pluggable (QSFP), Quad Small Form Factor Pluggable+ (QSFP+), Quad Small Form Factor Pluggable 28 (QSFP28), Quad Small Form Factor Pluggable 56 (QSFP56) transceiver, or Quad Small Form Factor Pluggable 112 (QSFP112) transceiver.

11. The method according to claim 7, wherein the QSFP-DD connector further comprises a plurality of legacy connection pads and a plurality of QSFP-DD connections pads configured to, in an operational configuration, operably connect the QSFP-DD transceiver with the inner connector.

12. The method according to claim 11, wherein the connectivity circuitry is configured to determine the presence of the noncompliant transceiver by identifying an absence of connectivity associated with at least one QSFP-DD connection pad.

13. A method for network communications, the method comprising:
monitoring a second end of an adapter housing, wherein the second end is configured to receive a Quad Small Form Factor Pluggable Double Density (QSFP-DD) transceiver therein;
determining the presence of a noncompliant transceiver received by the second end of the adapter housing; and
precluding communication between the noncompliant transceiver and a first end of the adapter housing configured to engage an Octal Small Form Factor Pluggable (OSFP) connector.

14. The method according to claim 13, wherein monitoring the second end of the adapter housing further comprises monitoring a plurality of legacy connection pads and a plurality of QSFP-DD connection pads of a QSFP-DD connector positioned proximate the second end of the adapter housing.

15. The method according to claim 14, wherein precluding communication between the noncompliant transceiver and the first end of the adapter housing further comprises grounding a connection to at least one legacy connection pad.

16. The method according to claim 13, wherein the noncompliant transceiver comprises a Quad Small Form Factor Pluggable (QSFP), Quad Small Form Factor Pluggable+ (QSFP+), Quad Small Form Factor Pluggable 28 (QSFP28), Quad Small Form Factor Pluggable 56 (QSFP56) transceiver, Quad Small Form Factor Pluggable 112 (QSFP112) transceiver.

17. The method according to claim 13, wherein the adapter housing comprises an inner connector positioned within the adapter housing and configured to, in an operational configuration in which the first end engages the OSFP connector and the second end receives the QSFP-DD transceiver, operably connect the QSFP-DD transceiver with the OSFP connector such that signals may pass therebetween.

18. The method according to claim 17, wherein the QSFP-DD connector is configured to receive a corresponding PCB of the QSFP-DD transceiver such that the PCB of the inner connector and the PCB of the QSFP-DD transceiver are substantially aligned.

19. The method according to claim 17, wherein the QSFP-DD connector is configured to receive a corresponding PCB of the QSFP-DD transceiver such that the PCB of the inner connector and the PCB of the QSFP-DD transceiver are coplanar.

20. The method according to claim 14, wherein determining the presence of the noncompliant transceiver received by the second end of the adapter housing comprises identifying an absence of connectivity associated with at least one QSFP-DD connection pad.

* * * * *

UNITED STATES PATENT AND TRADEMARK OFFICE
CERTIFICATE OF CORRECTION

| | |
|---|---|
| PATENT NO. | : 11,327,257 B1 |
| APPLICATION NO. | : 17/077089 |
| DATED | : May 10, 2022 |
| INVENTOR(S) | : Margolin et al. |

It is certified that error appears in the above-identified patent and that said Letters Patent is hereby corrected as shown below:

On the Title Page

The publication data should be added to read:
--(65)  Prior Publication Data
US 2022/0128779 A1    Apr 28, 2022--

Signed and Sealed this
Eighteenth Day of October, 2022

Katherine Kelly Vidal
*Director of the United States Patent and Trademark Office*